(12) United States Patent
Manzur

(10) Patent No.: US 10,090,634 B1
(45) Date of Patent: Oct. 2, 2018

(54) ROBUST LASER COMMUNICATIONS

(71) Applicant: Tariq Manzur, Lincoln, RI (US)

(72) Inventor: Tariq Manzur, Lincoln, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/826,836

(22) Filed: Nov. 30, 2017

(51) Int. Cl.
| | |
|---|---|
| *H04B 10/00* | (2013.01) |
| *H01S 3/23* | (2006.01) |
| *H01S 3/067* | (2006.01) |
| *H01S 3/00* | (2006.01) |
| *H04B 10/66* | (2013.01) |
| *H01S 3/13* | (2006.01) |
| *H04B 10/11* | (2013.01) |
| *H04B 10/50* | (2013.01) |

(52) U.S. Cl.
CPC .......... *H01S 3/2391* (2013.01); *H01S 3/0085* (2013.01); *H01S 3/06754* (2013.01); *H01S 3/1302* (2013.01); *H01S 3/1305* (2013.01); *H04B 10/11* (2013.01); *H04B 10/505* (2013.01); *H04B 10/66* (2013.01)

(58) Field of Classification Search
CPC .. H01S 3/2391; H01S 3/0085; H01S 3/06754; H01S 3/1302; H01S 3/1305; H04B 10/11; H04B 10/505; H04B 10/66; H04B 10/1127; H04B 10/1129
USPC .......................................................... 398/130
See application file for complete search history.

(56) References Cited

U.S. PATENT DOCUMENTS

| | | | | |
|---|---|---|---|---|
| 9,331,810 | B2 * | 5/2016 | Chen | H04J 14/025 |
| 9,927,621 | B2 * | 3/2018 | Honea | G02B 27/0927 |
| 2004/0258415 | A1 * | 12/2004 | Boone | H04B 10/1125 |
| | | | | 398/125 |
| 2016/0291137 | A1 * | 10/2016 | Sakimura | G01S 17/58 |

* cited by examiner

*Primary Examiner* — M. R. Sedighian
(74) *Attorney, Agent, or Firm* — James M. Kasischke; Michael P. Stanley

(57) ABSTRACT

A laser communication apparatus is provided for sending and receiving messages. A processor encodes user messages for a modulator. The modulator provides control signals related to the encoded message to a plurality of seed lasers. Each seed laser can provide light at a different wavelength. Amplifiers are joined to amplify light from the seed lasers. Amplified light is multiplexed together. Multiplexed light is transmitted by a collimating lens along a target vector. A portion of the light can be monitored by a first detector. A telescope receives light from the target vector and provides focused light to a second detector. The second detector provides a signal responsive to the received light to the processor. The processor decodes this signal to provide the received message.

8 Claims, 2 Drawing Sheets

ROBUST LASER COMMUNICATIONS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a free space laser communications device and more particularly to multi-frequency laser communications device.

(2) Description of the Prior Art

Modulating a laser carrier with a communications signal for free space communications is well known in the art. Light from the modulated laser is transmitted through optics such as a collimating lens in order to increase range.

To the extent that these communications methods use visible light, there are problems with wave front distortion caused by changes in atmospheric pressure and density. Adaptive optics are known to deal with these phenomena by measuring the distortion and providing a mirror or lens that can correct transmitted and received light. It is known to use deformable mirrors, lenses and liquid crystal devices for this.

Another problem with free space laser communications is security. Because free space laser communications can be line of sight between known sources, an outside party can attempt to intercept or interfere with these signals by intervening between the two sources. Many laser communications systems use a single modulated laser that operates around a known frequency. Jamming this laser is easier because of the narrowness of the band around the single frequency. It is thus desirable to have a communications system that utilizes several different frequencies that allows complex encoding.

SUMMARY OF THE INVENTION

It is a first object of the present invention to provide a laser communications transceiver that transmits a robust signal at a variety of frequencies.

Another object is to provide a laser communications transceiver that can utilize modulate the transmitted light in a variety of schemes to enhance security and transmission rates.

Accordingly, there is provided a laser communications apparatus for sending and receiving messages. A processor encodes user messages for a modulator. The modulator provides control signals related to the encoded message to a plurality of seed lasers. Each seed laser can provide light at a different wavelength. Amplifiers are joined to amplify light from the seed lasers. Amplified light is multiplexed together. Multiplexed light is transmitted by a collimating lens along a target vector. A portion of the light can be monitored by a first detector prior to transmission. A telescope receives light from the target vector and provides focused light to a second detector. The second detector provides a signal responsive to the received light to the processor. The processor decodes this signal to provide the received message.

Other embodiments could use adaptive optics to enhance light transmission and reception.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
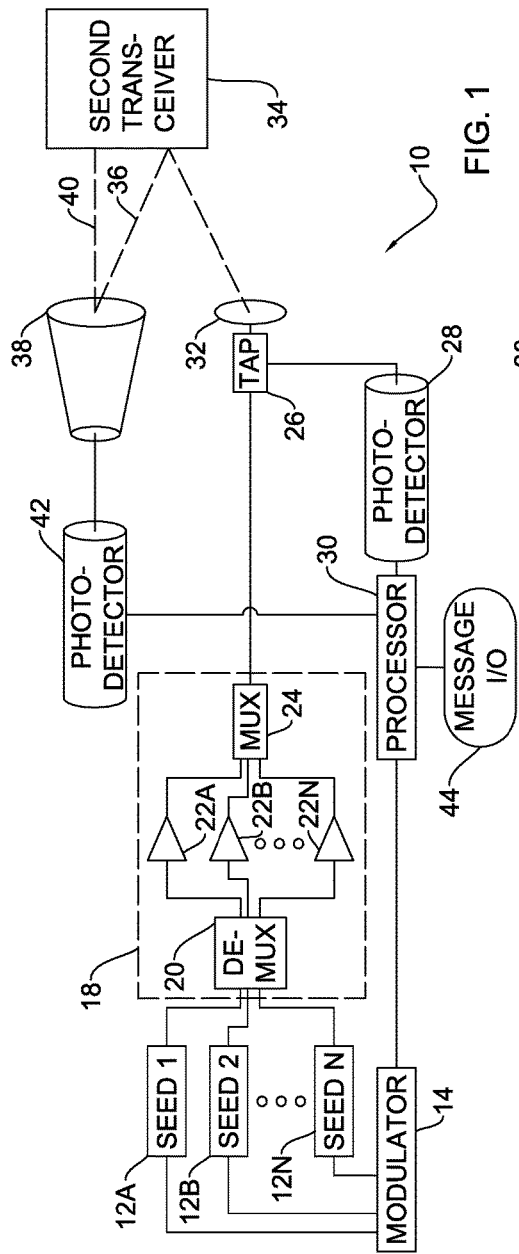
FIG. 1 is a diagram of a first embodiment of the invention.

FIG. 1 shows one transceiver 10 of a communication system 10 in accordance with one embodiment. A plurality of seed lasers 12A, 12B through 12N can be utilized as laser sources. Preferably each of these seed lasers has a different frequency range; however, increased power could be obtained by having multiple lasers at the same frequency. Seed lasers are preferably continuous wave solid state lasers. Seed lasers 12A and 12B through 12N are joined to a controllable modulator 14. One modulator 14 can be provided for each laser or a single modulator can be joined to all of the lasers as shown. Using multiple modulators and seed lasers having different frequencies allows bandwidth enhancing techniques such as frequency division multiplexing. Modulator 14 can provide many different modulations known in the art. These include pulse modulation, pulse width modulation, frequency modulation (FM), amplitude modulation (AM), frequency shift keying (FSK), binary frequency shift keying (BFSK), phase shift keying (PSK), amplitude shift keying (ASK), quadrature amplitude modulation (QAM), code division multiple access (CDMA) and the like.

Output from seed lasers 12A, and 12B through 12N is provided to a wide band optical amplifier circuit such as that shown at 18. One such circuit is described in U.S. Pat. No. 6,307,668 which is incorporated by reference herein. In circuit 18, optical input can be provided on a single input line and then demultiplexed by demultiplexer 20 into a plurality of outputs wherein each output has a different frequency range. Demultiplexer 20 outputs are joined to an associated amplifier 22A and 22B through 22N. In the preferred embodiment, each amplifier is associated with the frequency provided by one particular seed laser. For example, seed laser 12A would provide an output frequency range that is complementary to amplifier 22A. Amplifier outputs are provided to a multiplexer 24 on circuit 18 where they can be combined on a single output line.

Figure 2:
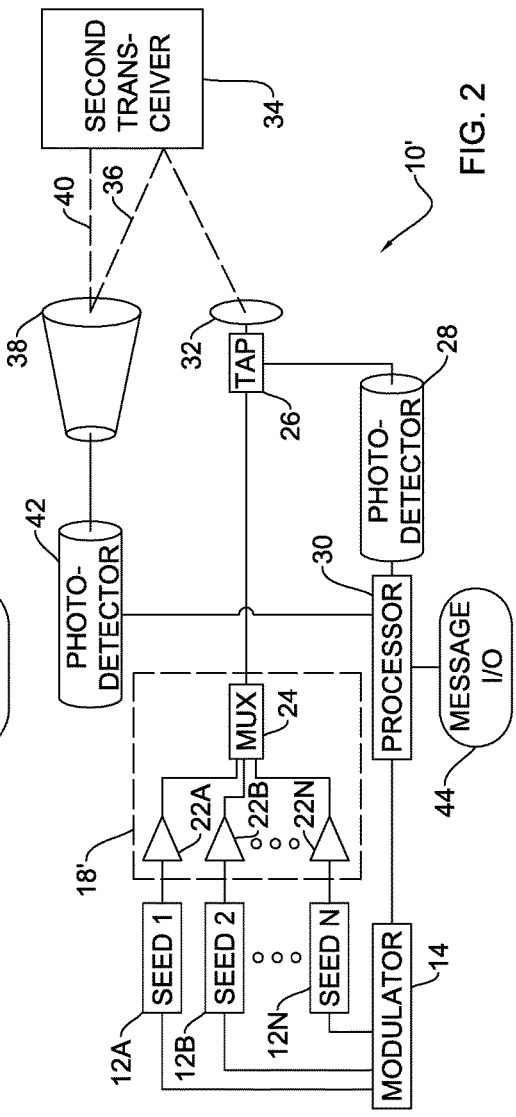
FIG. 2 is a diagram of a second embodiment of the invention.

In an alternative embodiment, shown in FIG. 2, output from seed lasers 12A, and 12B through 12N can be provided directly to an alternative circuit 18' that doesn't have demultiplexer 20. Seed laser 12A, and 12B through 12N outputs will be provided directly to amplifiers 22A, and 22B through 22N. As before, amplifier outputs will be multiplexed by a multiplexer 24 on to a single output line.

In either embodiment, a small portion of the output from multiplexer 24 is tapped at tap 26 to photodetector 28.

Photodetector 28 is joined to processor 30 to determine the laser wavelength, pulse width, pulse repetition frequency (PRF), and launch time. In order to maximize the transmitted signal, the portion of the output tapped should be the smallest portion that is sufficient to detect these parameters. In embodiments using adaptive optics, photodetector 28 allows comparison of signal characteristics between the transmitted signal and a reflected signal. This enhances the data security of the proposed system and allows for adaptation to environmental changes along the signal path. The remainder of multiplexer 24 output is collimated by a lens 32 and transmitted through free space toward a second transceiver 34. Output can be skewed within a narrow field of view by applying different amounts of light into the array of amplifiers 22. Through interaction with lens 32, output can bend at different angles depending on frequency. Output can also reflect off of second transceiver 34 as shown by path 36.

A telescope 38 is positioned to capture the reflected signal 36 and any transmission 40 from second transceiver 34. Telescope 38 focuses captured light on a second photodetector 42. The light path for telescope 38 can be collocated with the collimating lens 32 or at a known position away from the lens 32. In order to receive highly attenuated laser reflections, second photodetector 42 has highly sensitive photon counting capability.

Second photodetector 42 is connected to processor 30 to determine critical data concerning the detected signal and to decode any message content in the signal. Critical data includes time of arrival, and it may also include wavelength, pulse width, and pulse repetition frequency (PRF). Second photodetector 42 in conjunction with processor 30 may also measure wavefront and phase of the return signal 36 to provide data from which the level of turbulence along the laser path may be quantified.

Both photodetectors 28 and 42 interface with processor 30, which performs the signal processing. Processor 30 performs a continuous sweep over the photodetector 42 output to isolate and amplify the optical signals above background noise. (At extreme ranges, the signal level at photodetector 42 is likely to be comparable to that of background noise.)

Processor 30 is further connected to modulator 14 and a message input/output device 44 such as a general purpose computer with a monitor. Message input/output device 44 can receive user message entry and provide the message to processor 30 for encoding and provision to modulator 14. Messages decoded from signals received at processor 30 can be provided for display or storage to a user at message input/output device 44.

Figure 3:
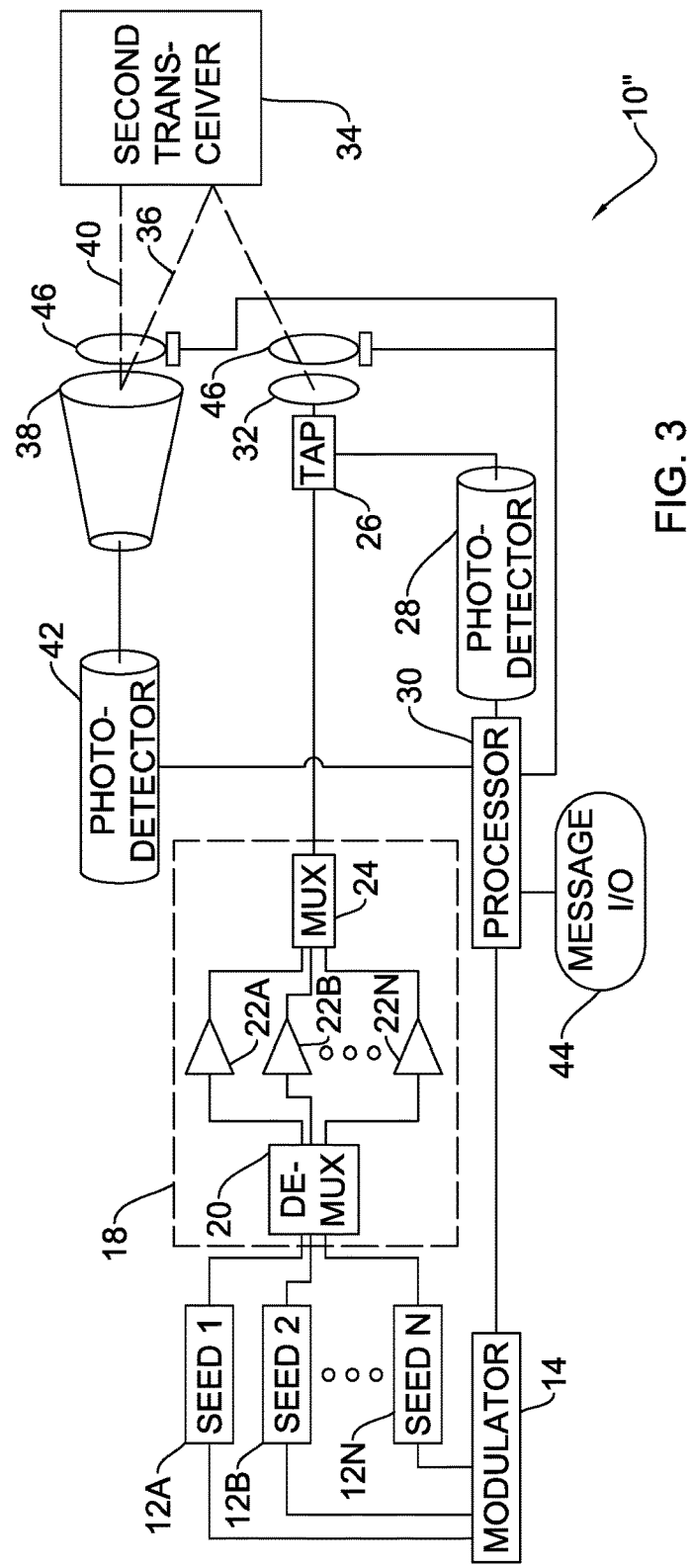
FIG. 3 is a diagram of a third embodiment of the invention.

FIG. 3 shows an additional embodiment 10" in which processor 30 also measures the pulse shape and pulse broadening. The analog pulses can be converted into the digital domain to facilitate comparison of the transmitted and received signals. The collected parameters allow derivation of a measurement of turbulence over the optical pathway. These defects can be corrected by providing adaptive optics 46 in conjunction with lens 32 and telescope 38 that can correct for turbulence or other environmental conditions along the free space path. Adaptive optics 46 can include any system known in the art that can measure distortions in the optical wavefront and correct the transmitted or received signal for these distortions. This can be performed with a controllable, deformable mirror; a liquid crystal array; or another technique known in the art.

In one specific embodiment, seed lasers 12A and 12B through 12N are three seed lasers having output wavelengths of 1500-1560 nm, 1600-1660 nm and 1850-2200 nm. Fiber laser amplifiers 22A and 22B through 22N are three fiber laser amplifiers having output wavelengths of 1530-1560 nm, 1600-1660 nm and 1900-2200 nm respectively. Modulator 14 is a radio frequency (rf) modulator that applies pulse width modulation and pulse repetition modulation to seed laser output. Optical or acoustic modulators can be used to apply modulation as well. Seed lasers are joined to a wideband fiber laser amplifier 18 such as that disclosed in U.S. Pat. No. 6,307,668. Amplifier 18 includes demultiplexer 20, fiber laser amplifiers 22A and 22B through 22N, and multiplexer 24. Multiplexer 24 provides output to tap 26 and collimated lens 32. The remainder of the components are joined as in FIG. 1 above.

In operation, a user enters a message in message input/output 44. The message can be any digital or audio message. Processor 30 electronically encodes the message for modulation by modulator 14. Modulator 14 provides electronic or optical control signals to seed lasers 12A, 12B . . . 12N with the encoded message. Optical seed laser outputs are provided to an amplifier which can be a broadband amplifier such as 18 of FIG. 1 or 18' of FIG. 2 to give an amplified laser output. A small portion of amplified laser output is directed to first photodetector 28 by a tap 26. Photodetector 28 provides electrical signals related to this small portion of output back to processor 30. The remaining, larger portion of amplified laser output is provided to a collimating lens 32 and transmitted to a second receiver or transceiver 34.

Second transceiver 34 can be identical to the robust laser communications device 10 taught herein or can be a similar device for receiving an encoded laser signal. Transceiver 34 can also provide similar encoded laser signals along path 40 for example. Such signals can be received by telescope 38 and provided to second photodetector 42. Second photodetector 42 provides an electrical signal responsive to the received optical signal to processor 30. Processor 30 can decode the electrical signal and provide an output to user through message input/output 44.

The apparatus taught herein has many advantages and features above the prior art. The seed laser and amplifier construction shown herein is much more controllable than directly modulating a source laser. The lower power seed lasers are easier to tune by techniques such as thermal tuning. Use of amplifiers enables providing light at the chosen frequency.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed. Obviously, many modifications and variations are possible in light of the above teaching. Such modifications and variations that may be apparent to a person skilled in the art are intended to be included within the scope of this invention as defined by the accompanying claims.

What is claimed is:

1. A laser communication apparatus for sending a user message and receiving a remote message comprising:
    a processor capable of receiving the user message and encoding the user message for transmission;
    a modulator joined said processor for receiving the encoded user message and capable of providing control signals related to the encoded user message;

a plurality of seed lasers joined to said modulator, each seed laser being capable of providing light at a different wavelength from at least one other seed laser at an output of the seed laser, said control signals from said modulator modulating said provided light from each of said plurality of seed lasers in a preselected scheme, the seed laser outputs being joined together as a single seed output;

a demultiplexer joined to the single seed output for distributing light therefrom to a plurality of demultiplexer outputs;

a plurality of laser fiber amplifiers, each joined to one said demultiplexer output for receiving light at a particular wavelength and amplifying the received light at an amplifier output;

a multiplexer joined to said plurality of laser fiber amplifier outputs and capable of combining the provided light at a multiplexer output;

a first tap joined to the multiplexer output and having a main output and a monitoring output;

a collimating lens joined to said first tap main output and capable of transmitting collimated light along a target vector;

a first detector joined to said first tap monitoring output and capable of providing a first detector output in response to light transmitted from said first tap monitoring output;

a telescope capable of receiving light from the target vector and providing focused light;

a second detector joined to said telescope and capable of providing a second detector output in response to light transmitted from said telescope; and said processor being joined to receive said second detector output and to decode said second detector output and provide the received message.

2. The apparatus of claim 1 wherein said collimating lens and said telescope are collocated.

3. The apparatus of claim 1 wherein:
said telescope is capable of receiving reflections of the transmitted collimated light along the target vector;
said second detector is capable of providing the second detector output in response to the received reflections; and
said processor compares said second detector output with said first detector output to measure turbulence in the environment affecting collimated light along the target vector transmitted by said collimating lens and received reflection by said telescope.

4. The apparatus of claim 3 wherein:
one of said collimating lens, said telescope, and both said collimating lens and said telescope are made with adaptive optics for countering measured turbulence in the environment; and
said processor includes an adaptive optics control output joined to components made with adaptive optics.

5. A laser communication apparatus for sending a user message and receiving a remote message comprising:

a processor capable of receiving the user message and encoding the user message for transmission;

a modulator joined said processor for receiving the encoded user message and capable of providing control signals related to the encoded user message;

a plurality of seed lasers joined to said modulator, each seed laser being capable of providing light at a different wavelength at an output of the seed laser, said control signals from said modulator modulating said provided light from each of said plurality of seed lasers in a preselected scheme;

a plurality of laser fiber amplifiers, each joined to one seed laser output for receiving light at a particular wavelength and amplifying the received light at an amplifier output;

a multiplexer joined to said plurality of laser fiber amplifier outputs and capable of combining the provided light at a multiplexer output;

a first tap joined to the multiplexer output and having a main output and a monitoring output;

a collimating lens joined to said first tap main output and capable of transmitting collimated light along a target vector;

a first detector joined to said first tap monitoring output and capable of providing a first detector output in response to light transmitted from said first tap monitoring output;

a telescope capable of receiving light from the target vector and providing focused light;

a second detector joined to said telescope and capable of providing a second detector output in response to light transmitted from said telescope; and said processor being joined to receive said second detector output and to decode said second detector output and provide the received message.

6. The apparatus of claim 5 wherein said collimating lens and said telescope are collocated.

7. The apparatus of claim 5 wherein:
said telescope is capable of receiving reflections of the transmitted collimated light along the target vector;
said second detector is capable of providing the second detector output in response to the received reflections; and
said processor compares said second detector output with said first detector output to measure turbulence in the environment affecting collimated light along the target vector transmitted by said collimating lens and received reflection by said telescope.

8. The apparatus of claim 7 wherein:
one of said collimating lens, said telescope, and both said collimating lens and said telescope are made with adaptive optics for countering measured turbulence in the environment; and
said processor includes an adaptive optics control output joined to components made with adaptive optics.

* * * * *